United States Patent [19]

Wirtz

[11] Patent Number: 4,459,536

[45] Date of Patent: Jul. 10, 1984

[54] VEHICLE ELECTRICAL SYSTEM WITH COMBINED ALTERNATOR AND STARTER MOTOR

[75] Inventor: Rainer Wirtz, Markgröningen, Fed. Rep. of Germany

[73] Assignee: Robert Bosch GmbH, Fed. Rep. of Germany

[21] Appl. No.: 407,764

[22] Filed: Aug. 13, 1982

[30] Foreign Application Priority Data

Sep. 10, 1981 [DE] Fed. Rep. of Germany ....... 3135891

[51] Int. Cl.[3] ...................... F02N 11/04; F02N 11/14; H02K 24/02

[52] U.S. Cl. ........................................ 322/10; 290/46; 318/138; 318/139; 322/90

[58] Field of Search .................................... 322/10–14, 322/89–91, 93, 94, 100; 318/138, 139, 254; 320/14, 61

[56] References Cited

U.S. PATENT DOCUMENTS

| | | | |
|---|---|---|---|
| 3,937,974 | 2/1976 | LaFuze | 290/46 |
| 4,088,943 | 5/1978 | Schmidt | 322/90 |
| 4,296,362 | 10/1981 | Beasley | 318/138 |
| 4,330,743 | 5/1982 | Glennon | 322/29 X |
| 4,347,464 | 8/1982 | Park et al. | 318/138 X |

*Primary Examiner*—R. J. Hickey

*Attorney, Agent, or Firm*—Frishauf, Holtz, Goodman & Woodward

[57] ABSTRACT

The same electrical machine geared to the fly-wheel of a vehicle engine serves as the starter and as the generator. This machine is excited by permanent magnets on a rotor and its stator is wound with two phase windings offset from each other by 90° electrical. Half-bridge rectifiers are utilized in a circuit cooperating with the center tap of each winding for charging the battery in generator operation, cooperating with a unit including at least one MOSFET for regulating the charging current. In motor operation the winding center taps are connected to one pole of the battery and the common connection of the MOSFETs is connected to the other pole of the battery so that these devices can operate as d.c. to a.c. converter elements for providing pulses in proper sequence to the erstwhile generator to make it operate as a motor.

3 Claims, 2 Drawing Figures

VEHICLE ELECTRICAL SYSTEM WITH COMBINED ALTERNATOR AND STARTER MOTOR

This invention concerns a d.c. on-board electrical supply system for a motor vehicle utilizing a permanently excited alternating current generator that can selectively be used as a starter motor for the vehicle engine by supply of power thereto from the starter battery. A permanently excited brushless electrical machine is desired for various kinds of motor vehicles which can be operated over a very large speed range on the one hand as a generator for lighting and, if desired, engine ignition, and on the other hand as a starting motor for the engine. Preferably such a machine should be integrated with the fly-wheel of an internal combustion engine.

SUMMARY OF THE INVENTION

It is an object of the invention to provide a vehicle electrical system embodying such a machine by the use of semiconductors and switches for efficiently switching over from generator service to starter service and vice versa and providing for satisfactory operation in both roles.

Briefly, the machine is equipped with a two-phase stator winding comprising two phase windings that are offset with respect to each other by 90° el.. The correspondence between mechanical and electrical degrees of rotation depends upon the number of pairs of poles with which the permanent magnet rotor of the machine is provided, as is well known.

Each phase winding operates in generator operation with a rectifier and two transistor means for regulating charging current, one connected with each end of the phase winding. A multiple switch is also provided for the switchover to motor operation in which the two phase windings are connected with one pole of the starter battery and the reference points of the transistors connected to the phase windings are connected to the other pole of the starter battery so that the transistor means are switched over to operation as d.c. to a.c. converters. Advantageously, the phase windings are center tapped so that their center taps can be switched to one pole of the starter battery for motor operation, in which case the rectifiers for generator operation are half bridge circuits in which diodes respectively connected to the phase winding ends have electrodes of the same polarity connected together. These common connections of like electrodes of the diode bridges are each switchable to the pole of the starter battery to which the transistor means are connected during motor operation.

The aforesaid transistor means may advantageously in each case contain a metal oxide semiconductor field effect transistor (MOSFET) for better regulation of the current with which the battery is charged during generator operation. The desired control of the transistor means can be made effective regardless of the polarity applied to the transistor means by the changeover switch by a special transistor circuit.

BRIEF DESCRIPTION OF THE DRAWINGS

The invention is further described by way of illustrative example with reference to the annexed drawing, in which.

DESCRIPTION OF THE ILLUSTRATED EMBODIMENTS

Figure 1:
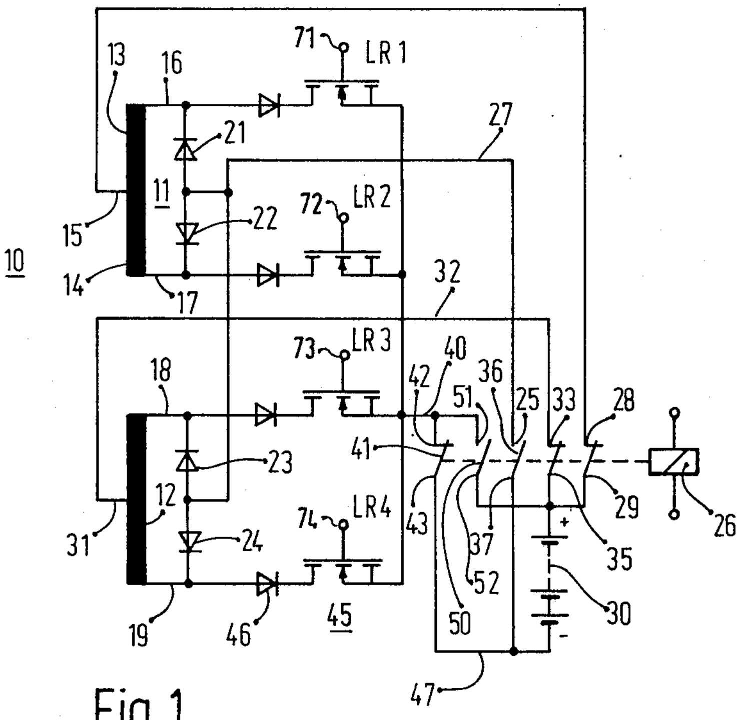
FIG. 1 is a schematic circuit diagram of the portions of an electrical supply system for a motor vehicle which are material to the present invention.

The circuit diagram given in FIG. 1 shows a permanently excited a.c. generator 10 having two phase windings 11 and 12. Each of the two is connected to circuit in the same way. The phase winding 11 consists of two winding halves 13 and 14 connected together at the winding center tap 15. The half-windings 13 and 14 are arranged to have induction in opposite phase and provide at the two winding ends 16 and 17 an alternating voltage that is shifted in phase by 90° electrical compared to the alternating voltage similarly arising between the winding ends 18 and 19 in the case of the phase winding 12.

The outer winding ends of the first phase winding 11 are each connected to the cathode of one of the diodes 21 and 22, of which the anodes are connected together. In an analagous manner the two bridge rectifiers 23 and 24 are provided across the second phase winding 12 and the connected together anodes of these diodes are connected to the anodes of the diodes of the first-mentioned pair and also, through a common lead 27 to a switch contact 25 of a five pole changeover switch 26. The center tap 15 of the first phase winding 11 is connected to a switch contact 28 of the changeover switch 26, of which the counter-contact 29 is connected to the positive pole of the starter battery 30 belonging to the d.c. on-board electrical system illustrated in the drawing. The center tap 31 of the second phase winding 12 is connected through a lead 32 to a switch contact 33 of the electromagnetically operated changeover switch 26 which in the illustrated motor operation position of the changeover switch 26 is connected to the counter-contact 35 and over this, like the center tap 15, to the positive pole of the battery 30.

In the motor operation position of the switch 30 illustrated in FIG. 1 the common connection lead 27 for the rectifiers 21,22 and 23,24 and the contact 25 connected to the lead 27 are disconnected from the counter-contact 37 that is connected to the negative pole of the battery 30.

The charging of the battery 30 proceeds during generator operation with the assistance of four pulse length regulators LR1, LR2, LR3 and LR4, which are of identical construction and are respectively connected to the winding ends 16, 17, 18 and 19 of the phase windings 11 and 12 on the one hand and lead to a common connection lead 40 on the other, the latter being connected to the negative pole of the starter battery in motor operation and to the positive pole thereof in generator operation as the result of the position of the switch arms 41 and 50 respectively controlling the contact pairs 42, 43 and 51, 52.

In each of the pulse length regulators there is a MOSFET 45 as shown for the regulator LR4 and a switching transistor 46 controlled by the MOSFET 45, by means not shown, but well known in the art for producing pulse length control. The positive voltage half-waves delivered from the winding halves of the phase windings 11 and 12 are connected through the switching transistor 46, by a variable delay after the null transition of the half-wave, to the common positive bus 47, which delay is the longer the higher the charge condition of the battery 30 is at the time. At the same time the common negative bus of the rectifiers 21 to 24 is connected through the switch arm 36 with the negative pole of the battery.

When the system is switched over, as shown in FIG. 1, to starting motor operation of the alternating current generator 10, the switch arm 50 lifts off its counter-contact and thereby cuts the pulse length regulators from the positive bus of the battery. In addition, the switch contacts 33 and 35 are connected together and likewise the contacts 28 and 29 and the respective center taps 15 and 31 of the phase windings 11 and 12 are switched to the positive pole of the battery 30, while at the same time the rectifiers 21, 22, 23 and 24 are cut off from the negative bus 47. Furthermore, a switcharm 41 connects together the contacts 42 and 43 and thereby connects the four pulse length regulators to the negative pole of the battery 30 so that they can operate as d.c. to a.c. converter elements in motor operation and sucessively supply operating current pulses offset each time by 90°, out of the battery 30 and into the winding halves of the phase windings 11 and 12.

Figure 2:
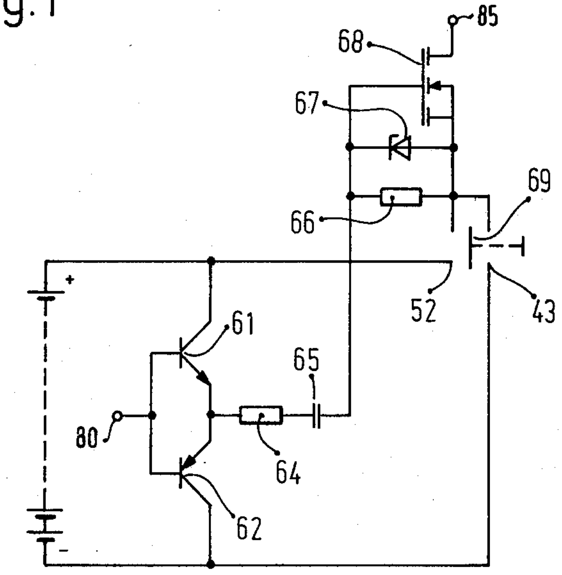
FIG. 2 is a detail of one form of circuit for providing regulation of charge current and for providing control of a MOSFET regardless of the polarity of the battery terminal to which the MOSFET has its switching path connected.

FIG. 2 is an example of a circuit for the pulse length regulators LR1 to LR4. In this case a MOSFET 68 serves also for performing the operation of each switching transistor 46. A special circuit featuring the transistors 61 and 62 is used for each MOSFET 68 which, according to the position of the changeover switch 26 could be connected with either the positive pole or the negative pole of the battery 30 (according to whether generator or motor operation is enabled). This special circuit consists of a pnp transistor 61 and an npn transistor 60 with its emitter-collector path in series with the corresponding path of the transistor 61. The two emitter electrodes that are connected together form a base point that can be switched over and is connected through a resistance 64 of about 1 k ohms and a series capacitor 65 of about 1 μF is connected to the parallel combination of a resistor 66 and the control electrode of the MOSFET 68. The plunger type contactor switch 69 makes possible the connection of the MOSFET 66 to the negative pole of the battery 30 for starter motor operation and to the positive pole of that battery for generator operation. The particular advantage of this circuit lies in the provision of the simplest way for switching over for starter motor operation to a d.c. to a.c. converter configuration and, for generator operation, to a pulse-length regulator of current, utilizing the same components for both manners of operation, thus causing these components to do double duty. The circuit of FIG. 2 allows the MOSFET 68 to serve the function of both the MOSFET 45 and the switching transistor 46 of FIG. 1.

In FIG. 1 the control electrodes 71, 72, 73 and 74 of the MOSFET 45 are connected to In FIG. 2 the connection 85 of the MOSFET 68 goes to one end of one of the windings 11 and 12 (where a rectifier diode is also connected) and is connected to Although the invention has been described with reference to particular illustrative embodiments, it will be understood that modifications and variations are possible within the inventive concept.

I claim:

1. D.c. on-board electrical supply system for a vehicle having a starter battery and an electrical machine excited by permanent magnets and serving selectively as an engine starter motor and as an electrical generator of the multiphase a.c. type and comprising the improvement wherein:

said electrical machine has a two-phase winding including two center-tapped phase windings (11,12) offset from each other by 90° el.;

a bridge rectifier (21, 22, 23, 24) provided for operative connection to each said phase winding in generator operation;

transistor means (46, LR) are connected to each end of each phase winding;

switching means (26) are provided to connect said transistor means to serve as current regulators in generator operation, to connect the center taps of both of said windings to the positive terminal of said starter battery and to connect said transistor means to the negative terminal of said starter battery in starter motor operation for enabling said transistor means to operate as current commutating means in motor operation.

2. On-board electrical supply system as defined in claim 1 in which each said bridge rectifier comprises diodes (21, 22; 23,24) having their cathodes connected to one of said phase windings and the anodes connected together, and in which said connected together anodes are in each case connected also for connection, respectively by a pair of contacts (25,37) of said switch means (26) to the negative pole of said starter battery (30) during generator operation of the system.

3. On-board electrical supply system as defined in claim 1 in which said transistor means include a metal oxide semiconductor field effect transistor (MOSFET) for each end of each said phase winding and a semiconductor switching circuit (61–65) for control thereof regardless of which polarity of said starter battery is applied by said switching means (26,69) to the end of the controlled path of the MOSFET remote from said winding.

* * * * *